United States Patent [19]

Thayer, III et al.

[11] Patent Number: 4,998,039

[45] Date of Patent: Mar. 5, 1991

[54] ULTRACOMPACT FLOW LOOP WITH NO ROTATING COMPONENTS

[75] Inventors: William J. Thayer, III, Kent; Chung-Hing Lo; John F. Zumdieck, both of Bellevue, all of Wash.

[73] Assignee: Amoco Corporation, Chicago, Ill.

[21] Appl. No.: 414,918

[22] Filed: Sep. 29, 1989

[51] Int. Cl.$^5$ .................. H01J 17/26; H01S 3/097
[52] U.S. Cl. ................... 313/231.41; 313/231.61; 372/58; 372/83
[58] Field of Search ............ 372/58, 89, 90, 83; 313/231.61, 231.51, 231.41

[56] References Cited

U.S. PATENT DOCUMENTS 4,283,686 8/1981 Daugherty et al. ............... 372/58
4,654,855 3/1987 Chun ........................... 372/58

Primary Examiner—James W. Davie
Attorney, Agent, or Firm—Seed and Berry

[57] ABSTRACT

A very compact flow loop for circulating gas through a pulsed laser or other pulsed discharge device is disclosed. An apparatus, having greater resistance to flow and shock wave propagation in the upstream direction, preferentially converts energy from the pulsed discharge residue into flow energy and causes flow through the discharge region in the desired downstream direction. The large available work in the discharge residue lets the efficiency of the conversion apparatus be very low and yet still provide sufficient flow power to circulate gas for purging a conventional flow loop without using a separate input of power to drive the purge flow. Moderate conversion efficiency provides sufficient flow power to allow compact, high loss components to be used for a very compact flow loop with no external flow circulation power and no rotating components.

9 Claims, 4 Drawing Sheets

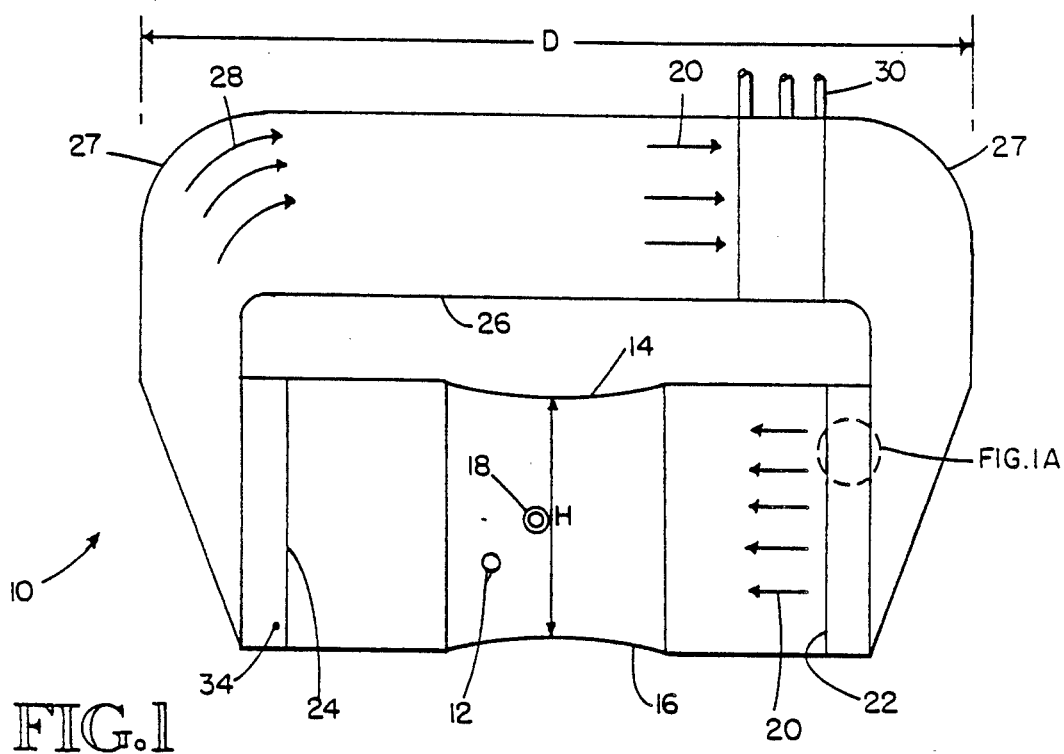
FIG.1
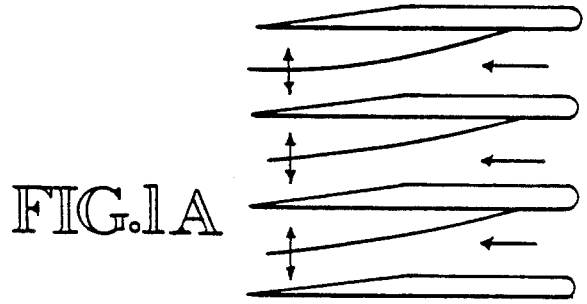
FIG.1A
FIG.2
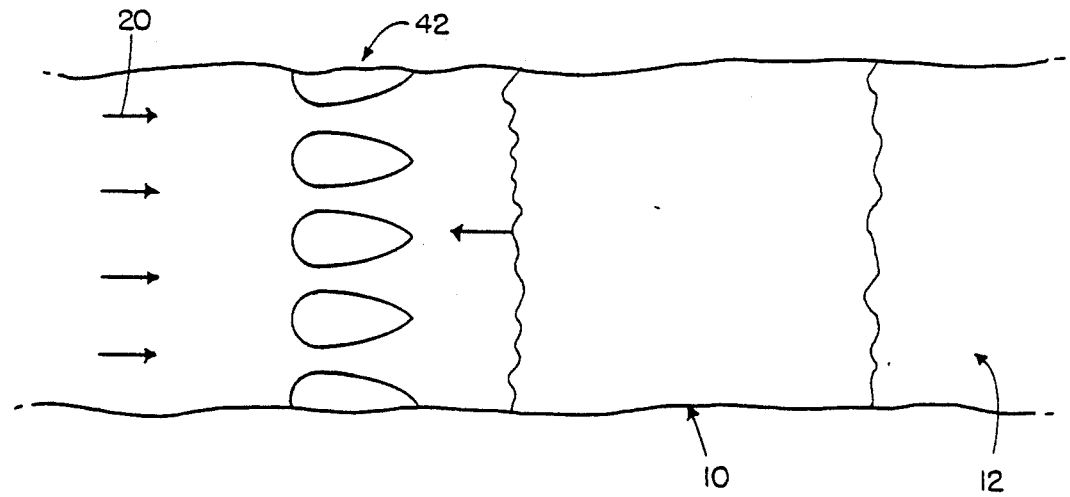

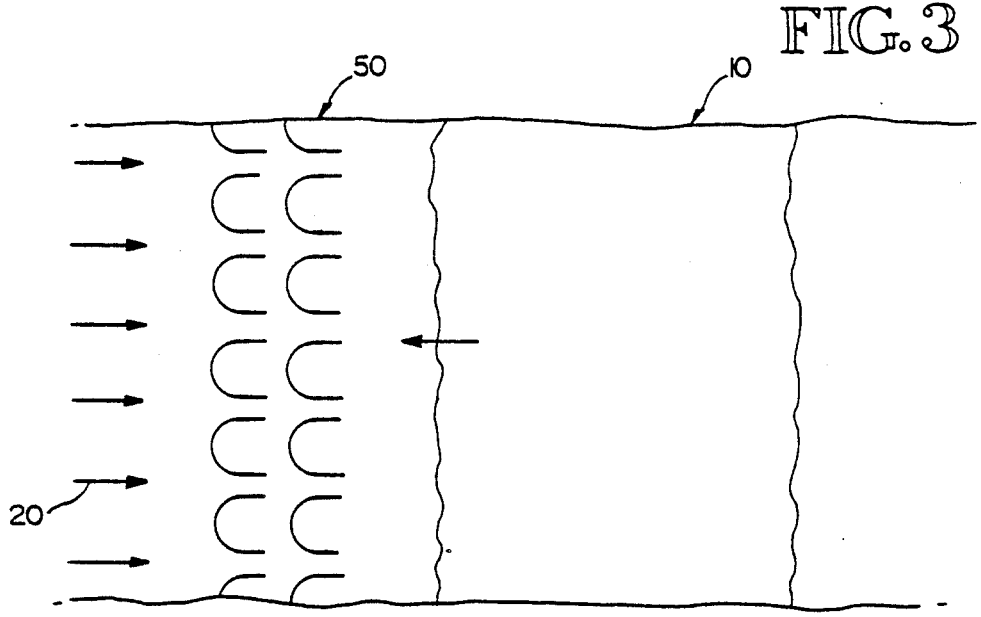
FIG. 3
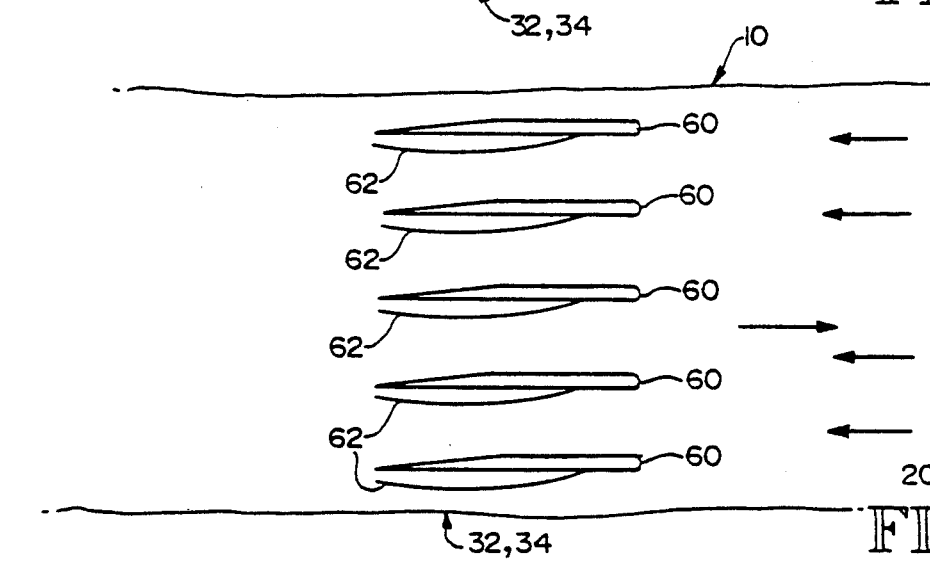
FIG. 5A
FIG. 5B

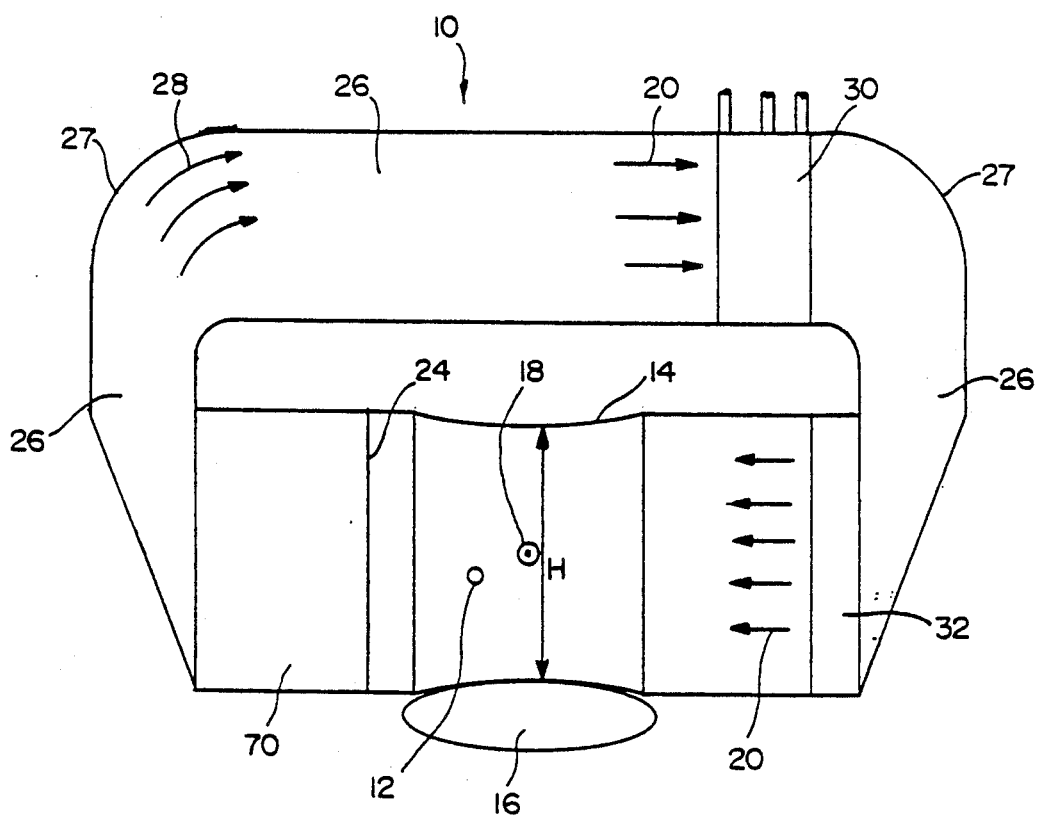

ULTRACOMPACT FLOW LOOP WITH NO ROTATING COMPONENTS

TECHNICAL FIELD

This invention relates to gas discharge laser systems and more particularly, to pulsed gas discharge laser systems having ultracompact flow loops.

BACKGROUND ART

Gas lasers are well known for their wide range of applicability due to their great variety of output parameters. For example, gas discharge lasers are capable of producing relatively large amounts of optical power. This is especially true if the gas discharge lasers are operated in a pulse mode having pulse repetition frequencies of up to 1 kilohertz or more.

To operate a gas discharge laser in a pulsed mode, it is necessary that the laser gas be ionized before each pulse of optical energy is produced. After a pulse of optical energy has been produced, it is necessary for the conditions in the discharge region to return to an equilibrium state such that the uniform medium conditions for the next optical pulse will be substantially the same as those for producing the preceding optical pulse. One way to accomplish this restoration of equilibrium conditions is to cause the laser gas to flow through the discharge region at a speed such that the disturbed conditions (including contaminating by-products of the previous electrical discharge) are swept out of the discharge region.

Transverse laser gas velocities of hundreds of meters per second or more can be required to permit successful operation of a pulsed gas discharge laser system at pulse repetition frequencies of 1 kilohertz or more. This, in turn, can require the consumption of significant amounts of power to operate the rotating motors and other components that cause the laser gas to flow transversely.

The energy which is deposited in the laser gas during each pulse of a repetitively pulsed laser is typically many times the energy that is emitted as laser light during that pulse. Typical laser efficiencies vary from less than one percent to as high as 15 to 20 percent. The electrical energy for exciting or pumping the laser gas for a pulsed laser must be added to the gas very rapidly, i.e., tens of nanoseconds to tens of microseconds, to have relatively high efficiencies. The energy addition is essentially instantaneous relative to the gas motion, and heats the gas at essentially constant volume. This raises both the gas pressure and temperature in the discharge region, in direct proportion to the energy added, typically to 1.3 or more times the initial energy, temperature, and pressure for a discharge laser.

The laser pulse is typically over in a few nanoseconds to a few microseconds, depending on the laser type. The residual hot, high pressure gas generally expands very rapidly, forming shock waves that propagate upstream and downstream of the energy addition region, disrupting the gas flow and causing undesirable flow disturbances. The expansion process returns the pressure of the gas in the energy addition region to its initial pressure in an unsteady manner, after which it would be very difficult to use the hot residue gas to self-generate flow. This hot, low pressure residue must then be purged from the energy addition region. The expansion energy is initially available within the high pressure gas in the laser cavity immediately after a discharge or pumping chemical reaction pulse, and can be used to generate gas motion during each pulse and on a continual basis.

In the past, this energy and the unsteady gas motions and pressure disturbances that it generates have been treated as undesirable for laser operation. The flow work or energy required to purge gas from the energy addition region per pulse, $W_f$, depends on the pressure loss in the flow loop, $\alpha p_1$, which in turn depends on the cavity dynamic head, $q_c$, which is a function of the gas density, $\rho$, the cavity flow velocity, $u_c$, and the flow loop configuration which causes a total loss of some multiple, $N$, of the cavity dynamic head. The relationship of these factors is expressed by the following two formulas:

$$q_c = 0.5 \rho u_c^2$$

$$\alpha p_1 = N q_c$$

The work per pulse $W_f$ to purge the hot residue from the laser cavity also depends on the volume of this region, $V_1$, and the distance that it has to be purged from its initial location relative to its initial width, $W$, normally referred to as the flush factor, $F$. The flow work per pulse is $$W_f = \alpha p_1 F V_1$$

For a typical discharge laser with a laser cavity region of 4 cm flow width, 4 cm discharge height, and optical length of 100 cm, pulse repetition frequency of 50 Hz, a flush factor of 3.0, a molecular weight of approximately 20, and flow loop loss of 4.0 times the cavity dynamic head, the flow work per pulse is approximately $2.8 \times 10^6$ dyne-cm.

The energy that is not emitted as laser light is thermalized within the gas in the laser cavity. This process takes place very fast relative to typical flow times, and fast compared to acoustic transit times across the laser cavity. The process is thus essentially instantaneous relative to gas motions, and results in what is generally referred to in thermodynamics as constant volume heating of the laser gas within the laser cavity. This constant volume heating process leaves the gas within the laser cavity at a high pressure and temperature with respect to the gas in the rest of the flow loop, on the order of 1.3 times the initial temperature and pressure for a typical discharge laser or 3.0 to 10.0 times the initial conditions for a pulsed chemical laser.

In conventional laser flow loops this discontinuity in pressure and temperature causes shock and expansion waves to form immediately after the laser pulse, and generates unsteady flows and pressure disturbances which must be suppressed while the hot residue is purged from the laser cavity prior to the next laser pulse occurring. However, the hot, high pressure gas in the laser cavity can be used to generate a continual flow of gas throughout the flow loop through the application of components that direct unsteady flows in a preferred direction and thus create the needed purge flow. The expansion power available in the hot, high pressure laser residue is sufficient to drive flow through the high pressure loss components needed to cool and homogenize the gas in a very compact flow loop. The expansion work available immediately after the energy addition depends on the initial pressure, $p_1$, the energy addition volume, $V_1$, the specific heat ratio of the gas, $\gamma$, and the heated gas pressure, $p_2$, by the equation $$W_e = p_1 V_1 \frac{(p_2/p_1)^{\frac{\gamma-1}{\gamma}} - 1}{\gamma - 1}$$

This is typically one hundred times, or more, than the flow work, $W_f$, per pulse, or flow power, that is required to circulate flow within a laser flow loop. In general, the ratio of the expansion work available per pulse to the flow work required to purge the hot residue is:

$$\frac{W_e}{W_f} = 2RT \frac{(p_2/p_1)^{\frac{\gamma-1}{\gamma}} - 1}{N(\gamma - 1) u_c^2}$$

The available energy is many times the energy per pulse needed to drive the gas flow required to purge the laser cavity for many pulsed lasers. Thus, the conversion of power available in the hot, high pressure residue into flow power can be inefficient and still generate adequate purge flow, or it can be made efficient and provide sufficient flow power to drive flow through relatively high resistance components or a high pressure loss flow loop.

It is therefore desirable to produce a pulsed laser system having an ultracompact flow loop with no rotating components. Through appropiate design of the laser flow loop or other flow loop, the energy added by each pulse of the laser operation can be used to establish an average flow in a desired direction within an appropriately designed flow loop without having to incorporate fans, blowers, compressors or other conventional circulating devices.

Generally, very compact flow loops have high pressure losses due to the small flow passages and relatively high flow velocities, the pressure loss being proportional to velocity squared. Thus, the expansion work available in the hot residue immediately after a pulse can provide a means for self-generating the flow power needed to circulate gas within a very compact flow loop.

In summary, the waste energy that is deposited in the laser gas contained within the laser cavity of a repetitively pulsed gas laser can generate a continual flow of gas within a laser flow loop, and thus eliminate the need for a circulating fan, blower, or other rotating equipment. This gas flow can be used to purge the laser cavity and restore a uniform medium at the initial conditions for the next laser pulse. The relatively large amount of energy that is thermalized in the gas due to the inefficiency of typical discharge or chemically pumped gas lasers can provide a relatively large amount of pumping power to the gas. The potential work available in the waste gas immediately after the pulse makes it possible to construct a self-activating heat engine around the pulsed energy addition region to circulate the gas within the flow loop. This available flow work can provide a means for building very compact flow loops for repetitively pulsed gas lasers, as discussed above, and other pulsed devices which require purge flows.

While an ultracompact flow loop offers the advantages mentioned above, it also offers the advantage of significantly more compact design and significantly less mass. Conventional flow loops have a size which may be related to the energy addition or discharge height, H, and typically have a diameter that is between 10 and 50 times this height. The diameter of the self-pumping flow loop of the invention may be as small as two to three times the discharge height. This represents a very large reduction in flow loop volume and a correspondingly large reduction in weight.

In an alternative configuration of the invention, very small cross section ducts between flow components and small flow cross section components such as heat exchangers and thermalizers are used. The small cross section of such ducts will generally mean a large pressure loss due to high flow velocity. The high flow velocity, in turn, conventionally requires prohibitively large fans or blowers, large drive motors, and a significant penalty in laser efficiency. Thus, it is desirable to have an ultracompact flow loop which can self-generate large gas flows and flow power by utilizing self-actuating unsteady flow valves or passive, one-way unsteady flow components.

DISCLOSURE OF THE INVENTION

It is an object of the present invention to provide an ultracompact flow loop that requires no rotating components.

It is also an object of the present invention that the waste energy of the discharge be used to circulate gas within this flow loop.

It is another object of the present invention to provide an ultracompact flow loop that is significantly smaller than conventional flow loops.

It is still a further object of the present invention to provide an ultracompact flow loop that has significantly less weight than a conventional flow loop.

Still another object of the present invention is to provide an ultracompact flow loop which is more reliable than a conventional flow loop because of its greater simplicity.

It is still another object of the present invention is to minimize the amount of external power and the number of external power sources required to operate a laser or other flow loop and to use this power most efficiently.

According to one aspect, the invention is an ultracompact flow loop in a system having a discharge region with an inlet and an outlet. The discharge region is swept in a predetermined direction by a flow gas passing from the inlet to the outlet. The flow loop comprises a closed flow duct, possibly including a heat exchanger connected between the outlet and the inlet. The flow duct conveys the flow gas from the outlet to the inlet. The flow loop also comprises conversion means for converting at least a portion of the discharge energy in the flow loop to circulate the flow gas through the discharge region and the closed flow duct. In a specific aspect of the invention, the conversion means is adapted to present less resistance to the flow gas passing in the predetermined direction. To accomplish this, the conversion means comprises a number of valves adapted to substantially prevent passage of the flow gas in the direction opposite to the predetermined direction.

BRIEF DESCRIPTION OF THE DRAWINGS

FIG. 1 is a schematic drawing of a transverse cross sectional view of an ultracompact flow loop according to the present invention.

FIG. 1A is an enlarged view of the encircled portion of FIG. 1 indicated by "A".

FIG. 2 is a close-up cross-sectional view of a first preferred embodiment of an upstream valve array usable in the present invention.

FIG. 3 is a close-up cross-sectional view of a second preferred embodiment of an upstream valve array usable in the present invention.

FIG. 5A is a schematic diagram of a low mass valve array used in the embodiment of FIG. 1, showing the valves in a closed position.

FIG. 5B is a schematic diagram of the low mass valve array of FIG. 5A, showing the valves in an open position.

FIG. 6 is a schematic diagram of a transverse cross sectional view of a second embodiment of the ultracompact flow loop of the present invention.

DETAILED DESCRIPTION OF THE PREFERRED EMBODIMENT

Figure 4:
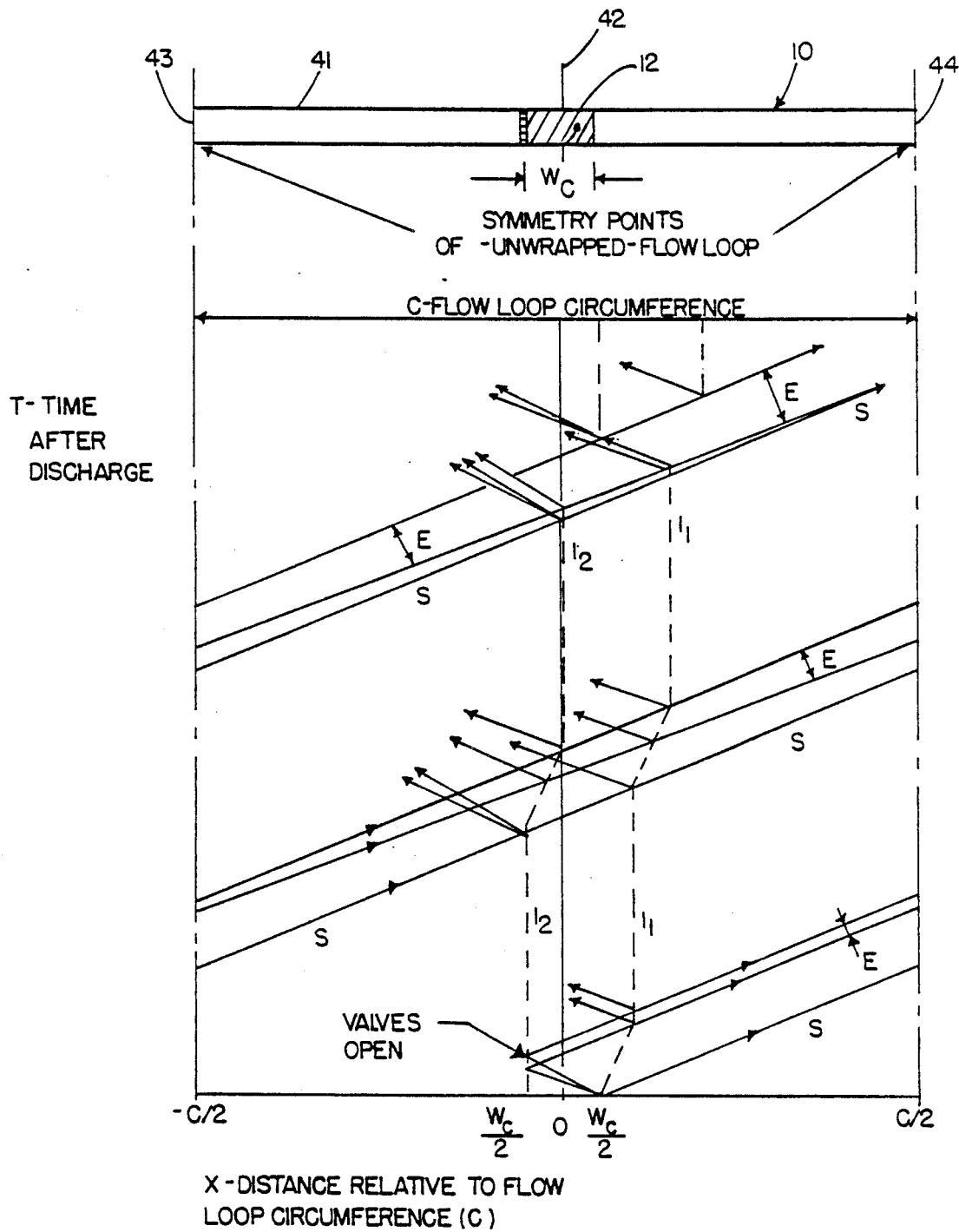
FIG. 4 is a wave diagram illustrating the unsteady gasdynamics which explain the operation of the present invention.

A first embodiment of an ultracompact flow loop 10, according to the present invention, is shown in FIG. 1. FIG. 1A is an enlarged view of the encircled portion of FIG. 1 indicated by "A". A discharge region 12 includes a pair of electrodes 14 and 16. An electric potential is applied between the electrodes 14 and 16, to create an electric field in the discharge region 12 with a laser gas therein. When the electrical potential between the electrodes 14 and 16 reaches a threshold voltage, the breakdown occurs between the electrodes 14 and 16, allowing current to pass from one electrode to the other. This severely disrupts the gas in the discharge region 12. If the discharge region is part of a pulsed laser system, the laser light pulse produced along an optical axis 18 (directed perpendicularly to the plane of FIG. 1) can create an additional disruption to the gas in the discharge region 12.

In order to sweep the disrupted gases caused by a pulse from the discharge region 12 in sufficient time for the discharge region 12 to accommodate the next pulse, a gaseous flow through the discharge region 12 is established. This gaseous flow has a means value and direction that is indicated by direction arrows 20 in FIG. 1. In a flow loop of the sort that is the subject of the present invention, the discharge region has an inlet 22 and an outlet 24. The ultracompact flow loop 10 includes a closed loop flow duct 26 that connects the discharge region outlet 24 with the discharge region inlet 22. The closed flow duct 26 can include a series of vanes 28 located at corners or bends 27 of the closed flow duct 26, and a heat exchanger 30. At its upstream end, the ultracompact flow loop 10 includes a valve array 32 which has low mass, self-actuating unsteady flow valves that reduce or prevent backflow into the closed flow duct 26. The valve array 32, which could also be another form of passive, one-way unsteady flow component, reflects pressure waves in the downstream direction (as shown by the direction arrows 20), which induces gas flow in the downstream direction.

The ultracompact flow loop 10 can optionally include a downstream valve array 34 at the outlet 24, in a downstream position.

The valve arrays 32 and 34 are low mass oscillatory valves and provide a positive closure, prevent backflow in the closed flow duct 26, and almost totally reflect the initial strong upstream propagating pressure or shock wave produced by the discharge and/or optical pulse in the discharge region 12. This stops the backflow that would otherwise be produced by the upstream propagating shock wave. As such, the flow in the discharge region 12 in the downstream direction will be accelerated downstream by the downstream-propagating shock waves and by the reflected upstream-propagating expansion wave. When this expansion wave passes through the closed flow duct 26 and reaches the upstream valve array 32 in the upstream position, it will also open the low mass valves in the valve array 32.

The channel length of the closed flow duct 26, the area variations of the closed flow duct 26 with distance from the discharge region 12, and locations of other components such as bends 27, the vanes 28 and the heat exchanger 30 can be arranged to control the propagation and reflection of shock waves to optimize the purging done by the unsteady flow. This could take the form of "tunning" the unsteady flow in the flow loop to maximize unsteady gas displacement in the energy deposition region at the time of the next pulse. However, this is not necessary for the self-generation of a continual average purge flow.

FIGS. 2 and 3 show passive, stationary devices, such as appropriately located flow nozzles, wave reflector plates, backflow baffles, and diffusers (i.e., area contractions and expansions), at appropriate locations to interact preferentially with the shock waves. Either of the components shown in FIGS. 2 or 3 could be substituted for the valve arrays 32 and 34 shown in FIG. 1.

An upstream propagating shock wave 40 reaches a pressure wave reflector 42 after being generated in the discharge region 12. The pressure wave reflector 42 partially reflects the upstream traveling shock wave 40 and causes it to reverse direction, thereby contributing to the overall average gas flow indicated by the direction arrows 20.

The diagram of FIG. 3 shows yet another pressure wave reflector 50 that has a higher flow loss in the upstream direction than it does in the downstream direction. The pressure wave reflector 50, which can be placed at the location of upstream valve array 32 or downstream valve array 34 shown in FIG. 1, consists of an array of cup-shaped vanes that present more resistance to the upstream-traveling flow than they do to the downstream-travelling flow. Accordingly, the direction of the average flow in the ultracompact flow loop 10 is in the direction of the direction arrows 20. The unsteady flow components induce flow in the downstream direction by reflecting the shock waves 40 toward the downstream direction, and thus act somewhat like inefficient check valves for unsteady flow processes. The valve array 32 or 34 allows relatively unimpeded flow in the desired direction 20 and also allows the propagation of pressure waves which induce flow in that direction. However, they act as a greater impediment to backflow and reflect or prevent the propagation of pressure waves which would induce flow in the direction opposite to direction 20.

FIG. 4 is a simplified one-dimensional flow wave diagram illustrating the unsteady gasdynamics which explain the operation of the present invention. The diagram is a graph of time after the occurrence of a discharge versus distance relative to the position within the flow loop 10. Flow loop 10 has been "unwrapped" and is shown schematically as a straight channel 41. The center line 42 of the discharge region 12 defines the center of the horizontal distance axis, and the width of the discharge, $W_c$, is placed symmetrically about the center line 42. A valve array 32 is placed at the upstream edge of the discharge region 12, at location $x = -W_c/2$, to simplify the wave diagram and the explanation of the unsteady flow processor. The end points 43 and 44 of the channel 41 are identical and located one-half the loop circumference, C, from the discharge center line 42 in the actual flow loop 10.

The wave diagram shows the trajectories of pressure waves and distinct features of the gas such as interfaces between hot discharge residue and cold gas. A constant area flow loop has been assumed to eliminate complications associated with wave reflections from the flow loop components.

The discharge at zero time leaves a high pressure region of width $W_c$. A shock wave, S, immediately propagates in the positive direction from the downstream edge, $+W_c/2$, at a positive velocity, $u_1$, in the initially stagnant gas. An expansion wave, E, propagates from this location into the hot residue, lowering its pressure and inducing a positive velocity equal to that caused by the shock. The high pressure residue is prevented at $-W_c/2$ from expanding in the upstream direction by the valve array 32, which is assumed to close instantly when the backpressure is applied.

The gas at the valve array 32 remains stationary until the expansion wave arrives, at which point the expansion wave tends to accelerate the gas in the positive direction. The reflection of the upstream propagating expansion wave lowers the residue gas pressure to the local ambient level, and allows the valves to open. However, this wave is not strong enough to induce flow through the valve array and the velocity at the valves remains zero after the first reflection. The shock wave propagates around the flow loop, accelerating the gas as it moves. The reflected expansion wave propagates around the flow loop behind the shock wave, slowly overtaking it. The expansion wave just stops the gas it propagates through, leaving gas at zero velocity as indicated by the vertical trajectories of the interfaces $I_1$ and $I_2$. As the shock and expansion waves propagate, gas in the entire flow loop is momentarily accelerated to a velocity, $u_1$, and then decelerated to zero velocity, causing a pulsed motion. The flushing of the hot residue, bounded by the interfaces $I_1$ and $I_2$, results from multiple wave passages through the loop.

When the downstream propagating shock and expansion waves intersect and later pass through the hot residue, an impedance mismatch occurs. Partial wave reflections and transmissions occur when the shock and expansion waves intersect these interfaces, changing the wave strength and adding substantial complexity to this very simple wave diagram. The shock and expansion waves propagate around the loop on the order of 25 to 50 times, depending on the circumference, or length, of the flow loop, the acoustic velocity, and the pulse rate, prior to the next pulse. A gas displacement of approximately 1.0 centimeter occurs each time the wave pair passes through the discharge region 12, for the 4×4 cm $CO_2$ laser example used above. Multiple pulses will drive a steady flow due to superposition of many waves.

An appropriate unsteady flow computer code is necessary to model the real complexity of the loop and unsteady flow. However, the simple wave diagram of FIG. 4 illustrates how the valve array creates an asymmetric expansion which starts the gas flowing in the loop, and which will add to the gas momentum on each subsequent pulse.

FIGS. 5A and 5B show a portion of the valve arrays 32 and 34 of FIG. 1 in their closed and open positions, respectively. The valve arrays 32 and 34 include a number of parallel valve structures 60 which are generally oriented in the direction of the mean flow (indicated by the direction arrows 20). The parallel structures 60 can be, for example, valve bodies. A flexible valve portion 62, which is of very low mass, is attached to the upstream edges of each of the corresponding parallel valve structures 60. In their closed positions, the valve portions 62 seal against the next adjacent parallel valve structure 60, thereby effectively sealing the closed flow duct 26 from any upstream-traveling flow and shock wave propagation. This causes the shock wave to be reflected by the upstream valve array 32. However, when a downstream-propagating shock 40 has travelled to the position of either of the valve arrays 32 or 34, the flexible valve portions 62 are forced open adjacent to their corresponding parallel valve structure 60. This allows a relatively unobstructed flow of the laser gas through the valve array 32 or 34, in the downstream direction (indicated by the direction arrows 20).

FIG. 6 illustrates a second embodiment of the self-purged ultracompact flow loop 10 of the present invention. The features of this ultracompact flow loop 10 that are identical or similar to those shown in FIG. 1 will be given identical reference numbers.

The ultracompact flow loop 10 of FIG. 6 has been equipped to attenuate the acoustic sounds it produces. This is accomplished by placing a flow through bulk acoustic attenuator 70 adjacent to the outlet 24 of the discharge region 12. After passing through the acoustic attenuator 70, the laser gas flows through the closed flow duct 26 until it meets the vanes 28, which assist the flow in the ultracompact flow loop 10 to change its direction without losing much of the flow energy, contained in the flowing laser gas. The heated laser gas then passes through the heat exchanger 30 which in this embodiment is a heat pipe cooled heat exchanger. The heat exchanger 30 extracts the residual thermal energy from the discharge or other energy addition means and returns the circulating gas to approximately its initial temperature. Then, after the heated laser gas passes through the inlet 22 of the discharge region 12, the gaseous flow passes through the remainder of the discharge region 12.

The location and configuration of acoustic attenuator 70, and the overall configuration of the ultracompact flow loop 10, will provide for very rapid suppression of shock waves, limit the generation of very long wavelength pressure disturbances which correspond to flow loop acoustic oscillation modes, and will provide for a very compact flow loop and pulsed laser system configuration.

The length of an ultracompact flow loop 10 may be as small as two to three times height H of the discharge region 12 (see FIG. 1). This represents a very large reduction in flow loop volume and a correspondingly large reduction in weight.

In another alternative configuration using a conventional laser flow loop, very small cross-section duct sections are located between the flow components and the low flow cross-section components such as heat exchangers and thermalizers. The small cross section results in large pressure loss due to high flow velocity and would normally require prohibitively large fans or blowers, large drive motors, and a significant penalty in laser efficiency. However, with the present invention, the self-generation of large gas flows and flow power by utilizing self-actuating unsteady flow valves or passive, one-way unsteady flow components, makes possible very compact flow loops for lasers and other repetitively pulsed flow devices.

While the foregoing has described various embodiments of the present invention, those skilled in the art will appreciate that a number of alternative configurations can also be presented, these alternatives being within the spirit and scope of the following claims.

We claim:

1. An ultracompact flow loop for use in a system having a discharge region with an inlet and an outlet, said discharge region being swept in a predetermined direction by a flowing gas passing from said inlet to said outlet, said flow loop comprising:
   a closed flow duct connected between said outlet and said inlet, said duct conducting the flowing gas from said outlet to said inlet and being subjected to discharge energy from each discharge of a sequence of discharges in said discharge region, each said discharge generating expanding discharge products generating compression and expansion waves and unsteady gas flow; and
   energy conversion means closely coupled to each said discharge for converting at least a portion of the discharge energy into circulation energy in said predetermined direction by controlling the expanding discharge products to minimize said compression and expansion waves and said unsteady gas flow, said energy conversion means converting the minimized compression and expansion waves into said circulation energy by a plurality of passages of said waves through said energy conversion means before the next discharge in the sequence of discharges.

2. The ultracompact flow loop of claim 1 wherein said energy conversion means is adapted to present a greater impedance to the flow gas passing and compression waves propagating oppositely to the predetermined direction and expansion waves propagating in the predetermined direction than it presents to the flow gas passing and compression waves propagating in the predetermined direction and expansion waves propagating oppositely to the predetermined direction.

3. The ultracompact flow loop of claim 2 wherein said energy conversion means is adjacent said inlet.

4. The ultracompact flow loop of claim 2 wherein said energy conversion means is adjacent said outlet.

5. The ultracompact flow loop of claim 1, further comprising heat exchanger means located in said closed flow duct for removing residual heat from the flowing gas.

6. The ultracompact flow loop of claim 2 wherein said conversion means comprises a plurality of valves adapted to substantially restrict passage of the flowing gas in the direction opposite to the predetermined direction.

7. The ultracompact flow loop of claim 2 wherein said energy conversion means comprises a plurality of valves adapted to substantially restrict passage of gas flow and the compression waves in the direction opposite to the predetermined direction and the expansion waves in the predetermined direction.

8. An ultracompact flow loop for use in a system having a discharge region with an inlet and an outlet, said discharge region being swept in a predetermined direction by a flowing gas passing from said inlet to said outlet, said flow loop comprising:
   a closed flow duct connected between said outlet and said inlet, said duct conducting the flowing gas from said outlet to said inlet and being subjected to discharge energy from each discharge of a sequence of discharges in said discharge region, each said discharge generating expanding discharge products generating compression and expansion waves and unsteady gas flow; and
   energy conversion means having a greater resistance to flow of the flowing gas in the direction opposite to the predetermined direction than it does to flow of the flowing gas in the predetermined direction, for producing a mean flow of the flowing gas in the predetermined direction, said energy conversion means being closely coupled to each said discharge for converting at least a portion of the discharge energy into circulation energy in said predetermined direction by controlling the expanding discharge products to minimize said compression and expansion waves and said unsteady gas flow, said energy conversion means converting the minimized compression and expansion waves into said circulation energy by a plurality of passages of said waves through said energy conversion means before the next discharge in the sequence of discharges.

9. The ultracompact flow loop of claim 8, further comprising heat exchanger means located in said closed flow duct for removing residual heat from the flowing gas.

* * * * *